(12) United States Patent
Waldock et al.

(10) Patent No.: US 7,917,332 B2
(45) Date of Patent: Mar. 29, 2011

(54) SENSOR CONTROL

(75) Inventors: Antony Waldock, Bristol (GB); David Nicholson, Bristol (GB)

(73) Assignee: BAE Systems PLC, London (GB)

( * ) Notice: Subject to any disclaimer, the term of this patent is extended or adjusted under 35 U.S.C. 154(b) by 0 days.

(21) Appl. No.: 11/938,342

(22) Filed: Nov. 12, 2007

(65) Prior Publication Data

US 2009/0125274 A1 May 14, 2009

(51) Int. Cl.
*G06F 17/18* (2006.01)

(52) U.S. Cl. ........ 702/181; 706/906; 702/116; 702/194; 702/196; 382/317; 351/209; 348/E13.014; 348/E13.017; 340/521

(58) Field of Classification Search ................. 702/116, 702/179, 181, 194, 196; 351/209; 706/906; 348/E13.014, E13.017; 340/521; 382/317

See application file for complete search history.

(56) References Cited

U.S. PATENT DOCUMENTS

| | | | | |
|---|---|---|---|---|
| 5,122,976 A | * | 6/1992 | Bellows et al. | 702/185 |
| 5,451,960 A | * | 9/1995 | Kastella et al. | 342/59 |
| 5,984,475 A | * | 11/1999 | Galiana et al. | 351/209 |
| 2006/0139162 A1 | | 6/2006 | Flynn | |

FOREIGN PATENT DOCUMENTS

| | | |
|---|---|---|
| EP | 1596334 | 11/2005 |
| JP | 09-322052 | 12/1997 |
| WO | WO 03083500 | 10/2003 |

OTHER PUBLICATIONS

Collins et al., 'A UAV Routing and Sensor Control Optimization Algorithm for Target Search', 2007, UST Publication, pp. 1-13.*

United Kingdom Search Report form the United Kingdom Intellectual Property Office issued in Application No. GB0722159.1 dated Feb. 28, 2008.

David H. Wolpert, "Collective Intelligence", Nasa Ames Research Center, California, U.S.A, Jan. 23, 2003, pp. 1-15.

International Search Report dated Feb. 27, 2009 in corresponding PCT Application No. PCT/GB2008/003791 (15 pages).

Kalandros et al, "Tutorial on Multisensor Management and Fusion Algorithms for Target Tracking", American Control Conference, 2004, vol. 5, Jun. 30, 2004, pp. 4734-4748.

Guo et al, "Joint Multiple Target Tracking and Classification in Collaborative Sensor networks", vol. 23, No. 4, Apr. 1, 2005, pp. 714-723.

Manyika et al, Decentralised Data Fusion (DDF) Algorithm, Data Fusion and Sensor Management a decentralized information-theoretic approach, Ellis Horwood, 1994, 269 pps.

Notification Concerning Transmittal of International Preliminary Report on Patentability dated May 27, 2010, 7 pages.

* cited by examiner

*Primary Examiner* — Eliseo Ramos Feliciano
*Assistant Examiner* — Elias Desta
(74) *Attorney, Agent, or Firm* — Buchanan Ingersoll & Rooney PC

(57) ABSTRACT

A system and method of controlling a sensor to sense one target from a plurality of targets includes predicting states of the targets. A set of probability distributions is generated. Each probability distribution in the set represents a setting or settings of at least one control parameter of the sensor. An expected information gain value for each control parameter in the set is calculated. The information gain value represents an expected quality of a measurement of one of the targets taken by the sensor if controlled according to the control parameter, based on the predicted state of the target. Updating the set of probability distributions takes place to identify the sensor control parameters that maximise the expected information gain value. The sensor is then controlled in accordance with the maximising control parameters.

12 Claims, 5 Drawing Sheets

Fig.6A.
Performance for different numbers of sensors

Fig.6B.
Complexity of sampling for different numbers of sensors

SENSOR CONTROL

FIELD OF THE INVENTION

The present invention relates to controlling at least one sensor.

BACKGROUND TO THE INVENTION

Sensors are widely used for monitoring and surveillance applications and it is often useful to detect and track moving targets. Generally, any particular sensor will be limited in terms of the number of targets that it can sense at any one time and in many cases a sensor may be limited to sensing one target at any given time interval. Therefore, when there are multiple targets a decision will need to be made regarding which target a particular sensor is to measure/sense.

SUMMARY OF THE INVENTION

According to one aspect of the present invention there is provided a method of controlling a sensor to measure one target from a plurality of targets, the method including:

predicting states of a plurality of targets;

generating a set of probability distributions, each said probability distribution in the set representing a setting or settings of at least one control parameter of the sensor;

calculating an expected information gain value for each said control parameter in the set, a said information gain value representing an expected quality of a measurement of one of the targets taken by the sensor if controlled according to the control parameter, based on the predicted state of the target;

updating the set of probability distributions to identify the sensor control parameters that maximise the expected information gain value, and controlling the sensor in accordance with the maximising control parameters.

The step of predicting the states of the targets may be implemented using an information filter technique, such as an Information-Based Kalman filter. The target state may correspond to a spatial state of the target, such as coordinates representing its position, its bearing/trajectory and/or its velocity, and the step of predicting the state may use a target motion model.

The method may further include a step of using information regarding the state of the one target obtained by the sensor in the step of predicting the states of the targets.

The method can further include:

receiving information regarding a state of a said target from the plurality of targets obtained by at least one other sensor, and using the target state information received from the at least one other sensor in the step of predicting the states of at least some of the targets.

The expected information gain value may be calculated for a set of control parameters θ using an equation:

$$I_\theta(k) = \frac{1}{2}\log\frac{|Y(k|k-1) + I_\theta(k)|}{|Y(k|k-1)|}$$

where Y(k|k−1) is an information matrix at time k based on all measurements made by the sensor and/or the at least one other sensor up to time k−1 and $I_\theta(k)$ is an information matrix associated with a measurement made by the firstmentioned sensor at time k for a set of said control parameters.

The method may further include transferring information regarding the state of the one target obtained by the sensor to the at least one other sensor. The at least one other sensor may be configured to execute at least some of the steps of the method of the firstmentioned sensor.

The steps of generating the set of probability distributions and calculating the expected information gain values may include:

generating a sample block using the probability distributions over the control parameters of the sensor and the at least one other sensor;

evaluating a global objective function;

updating the set of probability distributions for the sensor and the at least one other sensor using the global objective function. The updating of the set of probability distributions using the global objective function may be achieved using a Monte Carlo Optimisation technique involving Immediate Sampling and parametric learning. The parametric learning technique may comprise Cross-validation.

According to another aspect of the present invention there is provided a sensor controllable to measure one target from a plurality of targets, the sensor including:

means for predicting states of a plurality of targets;

means for generating a set of probability distributions, each said probability distribution in the set representing a setting or settings of at least one control/configuration parameter of the sensor;

means for calculating an expected information gain value for each said control parameter in the set, a said information gain value representing an expected quality of a measurement of one of the targets taken by the sensor if controlled according to the control parameter, based on the predicted state of the target;

means for updating the set of probability distributions to identify the sensor control parameters that maximise the expected information gain value, and means for controlling the sensor in accordance with the maximising control parameters.

According to another aspect of the present invention there is provided a computer program product comprising computer readable medium, having thereon computer program code means, when the program code is loaded, to make the computer execute a method of configuring a sensor to sense one target from a plurality of targets substantially as described herein.

According to yet another aspect of the present invention there is provided a plurality of sensors substantially as described herein, each sensor being configured to communicate information that it obtains regarding the state of the one target to at least one other said sensor.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments. As such, many modifications and variations will be apparent to practitioners skilled in the art. Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

BRIEF DESCRIPTION OF THE DRAWINGS

The invention may be performed in various ways, and, by way of example only, embodiments thereof will now be described, reference being made to the accompanying drawings in which.

DETAILED DESCRIPTION OF THE DRAWINGS

Figure 1:
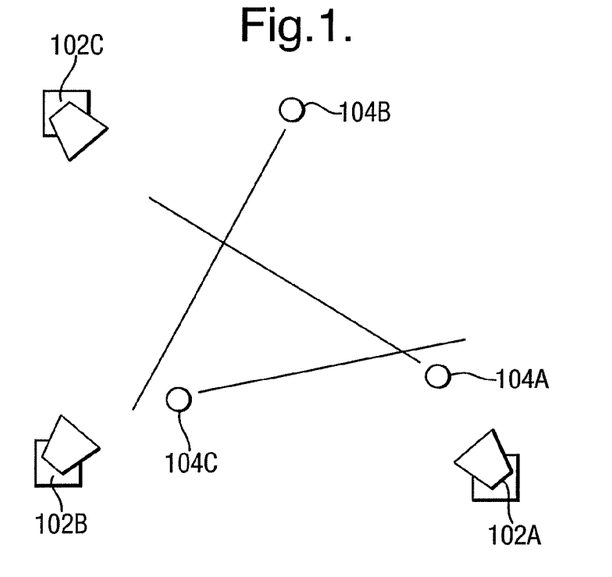
FIG. 1 is a schematic diagram of a plurality of sensors and plurality of targets.

Referring to FIG. 1, three sensors 102A-102C are shown in an environment in which there are three moving targets 104A-104C. It will be appreciated that the Figure is exemplary only and the system can operate with any number (from one upwards) of sensors and any reasonable number of targets. In the example the targets are moving (along the direction indicated by the respective arrows), whilst the sensors are essentially static. In other situations the sensor may be mounted on a vehicle, e.g. an autonomous land, air or water-based vehicle. The sensors can be controlled to improve sensing of a particular target, e.g. if the sensor includes an image input (e.g. a camera or infra-red image receiver) then the focus, orientation, etc of the image-receiving component can be set. An example of a sensor that could be used is AXIS 214 PTZ Camera used in CCTV systems. In alternative embodiments the sensors may be controllable in other ways, e.g. be relocated. The term "control" herein is intended to cover adjustments that may commonly be called "re-configuration", e.g. contrast or compression modification, as well as conventional control, e.g. movement, operations.

In some embodiments, the sensors can be configured as agents that are networked together and engage in tracking multiple targets in their environment (although other embodiments only require a single sensor). In multiple sensor embodiments, each sensor can take a resource-constrained action (orientate towards a particular target in the environment) that results in measuring the position of a limited number (e.g. one) of target(s). In embodiments where there is more than one sensor, two or more of the sensors may be allowed to form a coalition and measure the same target. The overall aim in such embodiments is to select a set of joint actions (sensor control parameters) that reduces the total amount of uncertainty associated with position and velocity estimates of the targets across the entire sensor network. In the example given herein, each sensor 102A-102C is only allowed to sense one of the targets during any time step, although two or more sensors can sense the same target.

Figure 2:
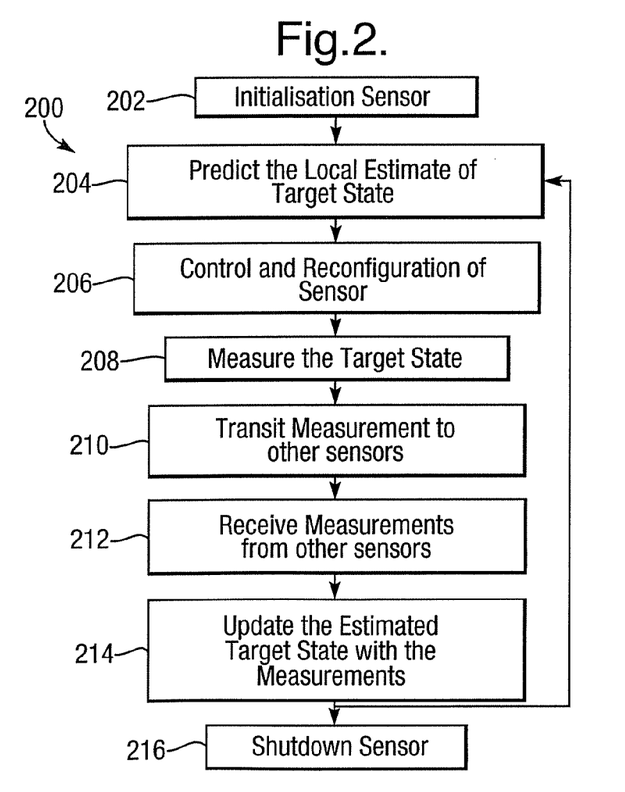
FIG. 2 illustrates schematically steps performed by an example process executed on a sensor.

FIG. 2 illustrates schematically steps performed by a processor that is in communication with one of the sensors 102A-102C. The processor may be integral with the sensor, or it may be remote. The process 200 is based on a Decentralised Data Fusion (DDF) algorithm (DDF is described in J. Manyika and H. F. Durrant-Whyte, Data Fusion and Sensor Management: A Decentralised Information-Theoretic Approach, Ellis Horwood, 1994). DDF imposes architectural constraints on the sensor network, which eliminate the conventional notion of a fusion centre as well as access to full knowledge of the global network topology by each sensor node. DDF also defines probabilistic information update algorithms that map to a variety of sensor network architectures. The algorithms are implemented at each sensor node, to filter and fuse their local data and to assimilate processed data from the other nodes.

In the example the sensor network comprises of N (3) stationary sensors engaged in tracking M (3) mobile targets in their environment. The sensors implement DDF-based algorithms to estimate the states of the targets. In the example, the states estimated are dynamic states, specifically position and velocity, but it will be understood that other states (e.g. bearing, temperature, identity, etc) could be processed. Interleaved within each sensor's DDF-based process is a target assignment algorithm that informs the sensor nodes about which target to observe, given the constraint they can only observe one-out-of-N targets at each sensing opportunity. However, two or more sensors may simultaneously observe the same target.

At step 202 the sensor algorithm and the physical sensor are initialised. The initialisation of the physical sensor will vary from device to device, but the algorithm initialisation will normally include initialising the sensor model. This can involve specifying the sensor position in Cartesian coordinates (assumed known); nonlinear model relating sensor observations in polar coordinates (range and bearing) to target state variables (position and velocity) in Cartesian coordinates; or range and bearing observation noise standard deviations. The target model is also initialised by specifying either a dynamic model (e.g. Newton's equations, but could be more complex) or a process model (i.e. a zero-mean noise process of specified standard deviation which captures difference between the target's true motion and its predicted motion). Sensor filter initialisation is also performed. A filter in this sense is a technique for calculating optimum (or near) estimates of process variables (target states) in the presence of noise. The filter is initialised to track the target state. The filter can be implemented using a variety of known techniques including a Kalman filter, particle filter or a Grid-based tracking technique. The target state(s) tracked can vary depending on the exact application, but in the example they comprise position and velocity. In embodiments where there are a plurality of cooperating sensors, step 202 can also involve registration and discovery of the sensors on a distributed sensor network.

At step 204 the sensor algorithm predicts the states of the targets by means of software implementation of equations that predict the target state (position and velocity) at one or more time steps in the future, based on the current state of the target and the target motion model. Kalman filter prediction equations are utilised in the example. The DDF-based algorithm 200 maintains information states relating to the targets for computational and communication efficiency. However, information also provides a direct normative basis on which to manage the sensor-to-target assignments. The key quantity is the Fisher information matrix, $Y(k|k)$, which is calculated directly by the information form of the Kalman filter. The notation $(k|l)$ refers to an estimate at time k conditioned on all observations up to and including time l. At step 204 of the example, the information filter of the sensor predicts the target state $Y(k|k-1)$ using a motion model for the specific target under track. The movement of the targets in the example are assumed to be based on a linear motion model with additive Gaussian process noise.

At step 206 the control/reconfiguration parameters of the sensor with respect to the target states predicted are set. The control or reconfiguration parameters can include, but are not limited to, position, orientation, internal reconfiguration or environmental manipulation. More specifically in the example, the parameter setting is performed so that the sensor is assigned to one of the plurality of targets it is to sense. A common assignment strategy is to assign sensor i to target j in order to maximise the mutual information gain $I_{i,j}(k)$, defined in Equation 1 below. The sensor i then uses its observation model to predict the amount of information, $I_{i,j}(k)$, associated with observing each target j at time k. The mutual information gain for an assignment i→j is:

Equation 1: Mutual Information Gain $$I_{i,j}(k) = \frac{1}{2}\log\frac{|Y_{i,j}(k|k-1) + I_{i,j}(k)|}{|Y_{i,j}(k|k-1)|}$$

At step 208 the sensor is controlled or reconfigured to observe/measure/sense the state of the selected target. The target state can be measured and expressed as a mean and standard deviation.

Steps 210 and 212 are performed in embodiments where there are a plurality of cooperating sensors. In embodiments involving one sensors only, these two steps are omitted and the other steps in the process 200 of FIG. 2 utilise information based on the measurements taken by the single sensor alone.

At step 210, when the sensor i has observed its assigned target j, the observed information $I_{i,j}(k)$ is sent to all other sensors in the sensor network. The target measurements can be communicated via a globally broadcast message or propagated across the network between sensors via a point-to-point protocol.

At step 212 the sensor receives information from the other sensors regarding the targets they have observed. The sensor i then assimilates its own information about the target with the information it has received about the target from its communication channels. The assimilation equation has the advantage of being additive in DDF:

Equation 2: DDF Information Update $$Y_{i,j}(k|k) = Y_{i,j}(k|k-1) + \sum_{i=1}^{N} I_{i,j}(k)$$

At step 214 the sensor processor updates the estimated target states. The filter of the sensor is updated using the measurements of the targets that has been taken by the sensor itself and, in embodiments involving several cooperating sensors, the measurements received from at least one of the other sensors. The distributed data fusion products can be fed back to the target state prediction step 204 to form the basis for further sensor control and distributed data fusion steps. The exchange and assimilation of observation information in DDF couples future sensor-to-target assignment decisions leading to coordinated decisions.

Step 216 is performed when the system is to be switched off and involves shutting down the sensor and network interfaces in a controlled manner.

In embodiments involving several cooperating sensors, negotiation techniques can be used to improve performance in terms of maximising the overall information gain resulting from substantially optimal sensor-to-target assignment. However, such negotiating does incur the expense of additional communication between the sensors. Explicit cooperation can be viewed as a distributed optimisation and a technique called Probability Collectives can be used to find the optimal joint action. For the example sensor configuration application, the cost function is defined in terms of the predicted information gain achievable from measuring a target's position. For a single sensor embodiment, the optimal control parameters (those that result in the minimum cost) can be found using an array of optimisation because sampling from the cost function is relatively efficient. The computational and communicational cost of sampling from the global cost function is expensive if the problem is not factorable, i.e. capable of being split into two single agent problems. Hence, the approach must intelligently sample from the global function to reduce the amount of computation and communication.

The problem of explicit cooperation within the context a distributed sensor network can be formulated as a distributed optimisation using the joint objective function defined in Equation 3 below:

Equation 3: Joint Objective $$\text{maximise}_A \left( \sum_{i=0}^{N} \sum_{j=0}^{M} \left( \frac{1}{2}\log\frac{\left|Y_{i,j}(k|k-1) + \sum_{i=0}^{N}(I_A(k))\right|}{|Y_{i,j}(k|k-1)|} \right) \right)$$

Equation 3 defines that from a given target to sensor assignment A, a sensor must evaluate the mutual information gain for all sensors and targets given the measurements taken by all sensors. This joint objective function is used for this work, but other objective functions are likely to include further terms that incorporate power requirements for sensing; time to execute the action; probability of acquisition, etc. Existing techniques that address explicit cooperation as a distributed optimisation are either centralised or rely on a smooth and differentiable utility function; however, the present inventors' approach eliminates this requirement and treats the optimisation as a Monte Carlo Optimisation (MCO). PC can be used to efficiently perform a distributed MCO.

PC is a broad framework for analysing and controlling distributed systems (see D. H. Wolpert, Collective Intelligence, Computational Intelligence Beyond 2001: Real and Imagined, Wiley, 2001). Typically an optimisation problem is solved by manipulating a set of optimisation variables, in a deterministic or stochastic fashion (e.g. Simulated Annealing), until some global objective or cost function of those variables is minimised. PC regards the variables as independent agents playing an iterated game. However, what is manipulated by PC is probability distributions over those variables. The manipulation process seeks to induce a distribution that is highly peaked about the value of the variables that optimise the global objective function.

A key result of PC is that the minimum value of the global cost function can be found by considering the maxent Lagrangian equation for each agent (variable). This is written as:

Lagrangian Equation $$L_i(q_i) = g_i(q_i) - T \times S(q_i) \qquad \text{Equation 4}$$

Here, $q_i$ is agent i's probability distribution over its actions denoted $x_i$; $g_i(q_i)$ is the expected cost evaluated with respect to the distributions of the agents other than i; T is temperature; $S(q_i)$ is the entropy associated with the probability distribution $q_i$. PC algorithms are still being actively researched and matured, but the example employs the following algorithm for optimising the Lagrangian:

---
Algorithm 2 PC Optimisation
---
1: beta ← $beta_{min}$
2: repeat
3:   iterations ← 0
4:   repeat
5:     Generate a Sample Block using $q_i$ from each agent
6:     Evaluate the expected global cost $g_i(q_i)$
7:     Update $q_i$ using $g_i(q_i)$
8:     iterations = iterations + 1
9:   until (iterations > $I_{max}$) OR (S($q_i$) < $S_m$in)
10:  beta ← alpha × beta
11: until beta < $beta_{max}$
---

The maxent Lagrangian is convex over the set of product distributions over the agent's action space. By operating on $q_i$ in this convex space it is possible to use powerful search methods for finding function extrema developed for continuous domain problems, such as gradient descent. Note that while adding entropy makes the descent easier, it also biases the solution away from extreme solutions. That bias is gradually lowered by annealing T.

The minimisation of the Lagrangian is amenable to solution using gradient descent or Newton updating since both the gradient and the Hessian are obtained in closed form. Using Newton updating and forcing the constraint on total probability, the following update rule is obtained:

Equation 4: PC Update Rule $$q_i(x_i) \rightarrow q_i(x_i) - \alpha q_i(x_i) \times \frac{E[G|x_i] - E[G]}{T} + S(q_i) + \ln q_i(x_i)$$

where $x_i$ is agent i's action and G is the global cost function. The parameter a plays the role of a step size since the expectations result from the current probability distributions of all the agents. Constraints can be included by augmenting the global cost function with Lagrange multipliers and the constraint functions.

Performing the update involves a separate conditional expected utility for each agent. These are estimated either directly if a closed form expression is available, or with Monte Carlo sampling if no simple closed form exists. In Monte Carlo sampling the agents repeatedly and jointly independent and identically distributed (iid) sample their probability distributions to generate joint actions, and the associated costs/utilities are recorded. Since accurate estimates usually require extensive sampling, the global cost G occurring in each agent i's update rule can be replaced with a private cost $g_i$ chosen to ensure that the Monte Carlo estimation of $E(g_i|x_i)$ has both low bias, with respect to estimating $E(G|x_i)$ and low variance. Now that the PC algorithm has been defined, the global cost function G used to enable cooperative behaviour needs to be identified.

DDF and PC are coupled by an information theoretic utility function: DDF operations create the utility function and PC determines the set of actions (here sensor-to-target assignments) that maximise it. Specifically, the total information contained in sensor i's DDF estimates of the target set is defined in Equation 5. The global objective is simply the sum of the individual sensors information contributions from across the sensor network. Thus:

Equation 5: Joint Objective Function for PC $$G_A(k) = -\sum_{i=0}^{N}\sum_{j=0}^{M}\left(\frac{1}{2}\log\frac{|Y_{i,j}(k|k-1) + \sum_{i=0}^{N}(I_A(k))|}{|Y_{i,j}(k|k-1)|}\right)$$

The minus sign appears above because PC performs minimisation. Now that the global cost function and actions have been defined, PC can be used to derive the optimal assignment. A decentralised implementation of PC will now be discussed.

As part of its optimisation process, PC requires each sensor to sample its probability distribution over sensor-to-target assignments. To perform the sampling in a decentralised sensor network (steps 5 and 6 in the PC optimisation algorithm above) a strategy based on the known token-ring strategy can be implemented. In token-ring message passing, the sensors are logically organised into a circle. A token travels around the circle to all the sensors on the network. To send a message around the network, a sensor catches the token and attaches a message to it. First, the token is passed around the network to build a sample block containing a set of joint actions. As the token arrives at each sensor, the current probability distribution over target assignments is used to populate the block with actions. Once a sample block has been constructed (been passed around the entire network), the token is passed back around the network to allow each sensor to evaluate the set of joint actions within the sample block.

As the global cost function (Equation 5 above) is a sum over all the predicted global information, the local cost is added to the sample block as the token circulates. At this stage, the sample block contained in the token represents the expected cost from using the current probability distributions over target assignments. This expected cost can be used to update the probability distributions locally on each sensor. This approach enables the sample block to be generated and evaluated in a distributed manner without using a centralised oracle.

The global information for a single sensor can be defined as:

Equation 6: Global Information for a Single Sensor $$\frac{1}{2}\sum_j \log(2\pi e)^9 |Y_{i,j}(k|k)|$$

Figure 5:
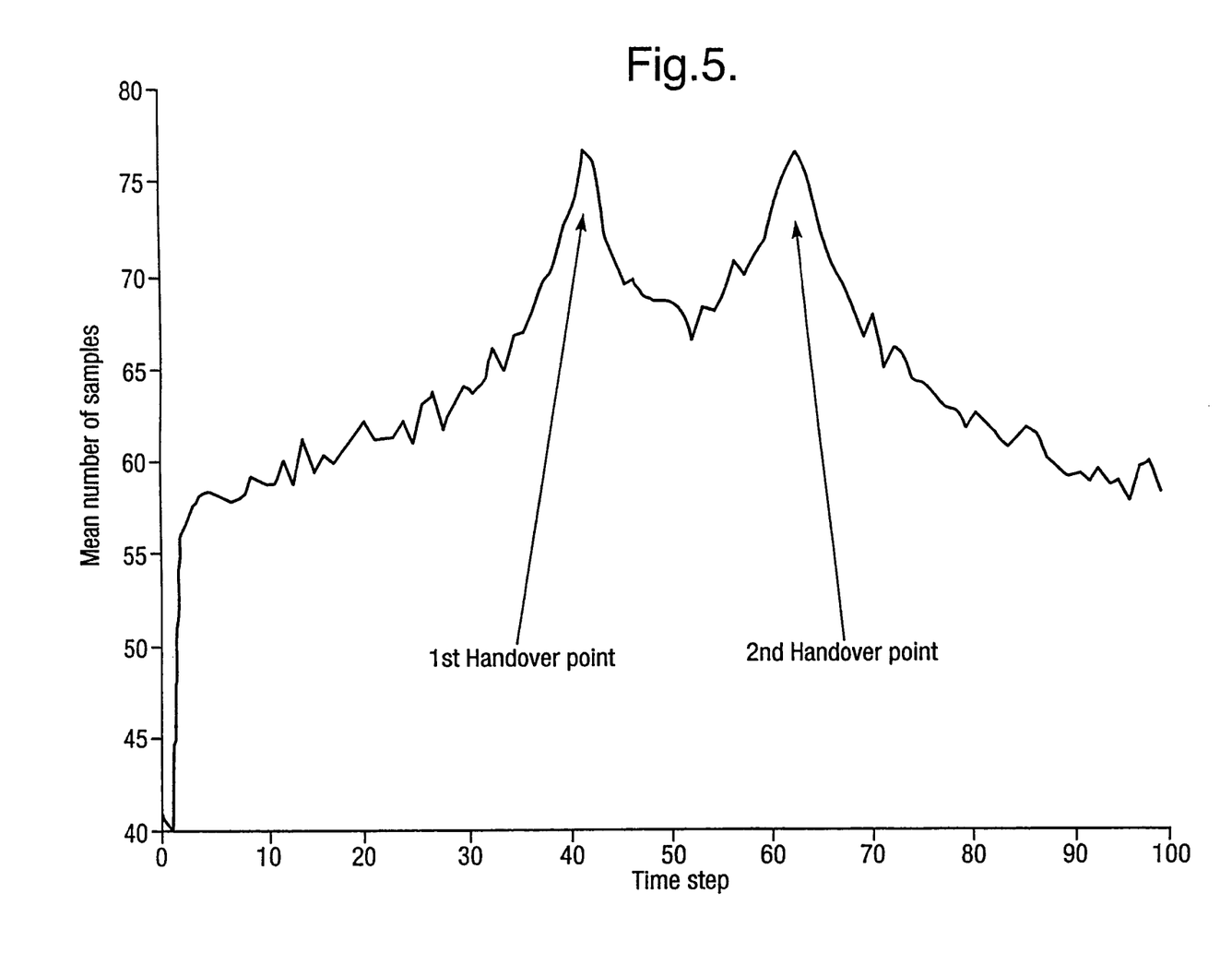
FIG. 5 is a graph showing a mean number of samples required for a time step during the target sensing process.

FIG. 5 shows the mean number of samples required for each time step during the tracking scenario involving three static sensors and three moving targets. The profile of the sampling required follows the cooperation required in the tracking scenario. The two peaks in the sampling performed correspond to handover points in the scenario. A handover point is when the sensor-to-target assignment strategy changes, i.e. for example, two sensors swap the targets to measure. At these points, a greater number of samples are required to determine the optimal assignment and provide evidence that the PC algorithm naturally adapts the communication dependant on the cooperation required. For example, at handover points when tight cooperation is required, the amount of sampling is increased. Although this result is encouraging, the amount of sampling and hence communication is disappointing because on average the sensors are performing between 40 and 77 samples per time step.

Figure 6A:
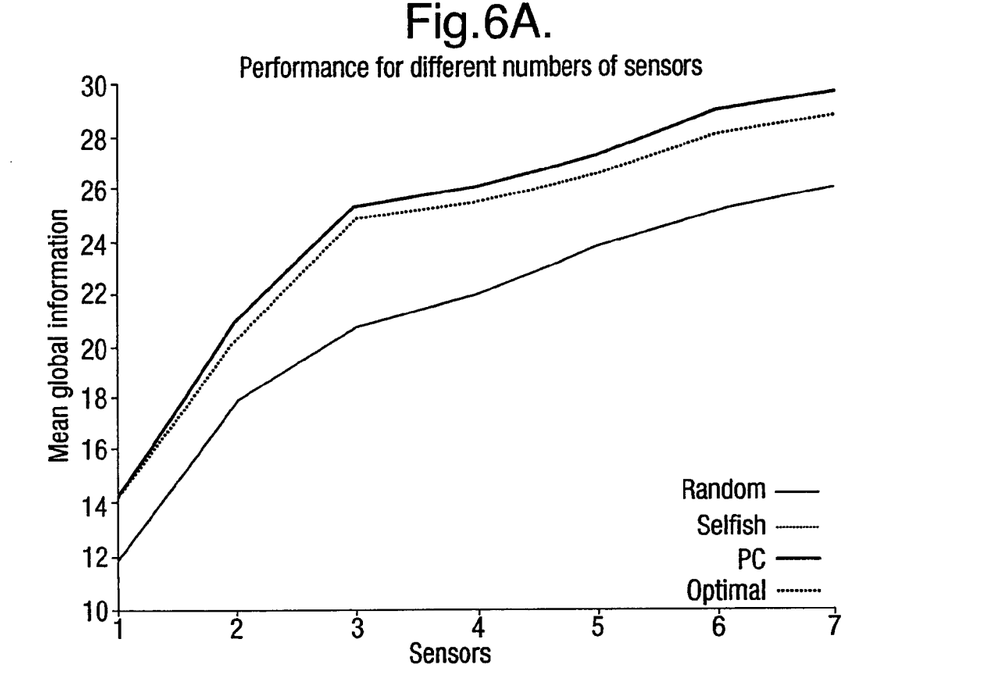
FIGS. 6A and 6B are graphs showing the mean global information and samples during the sensing process involving different numbers of sensors.
Figure 6B:
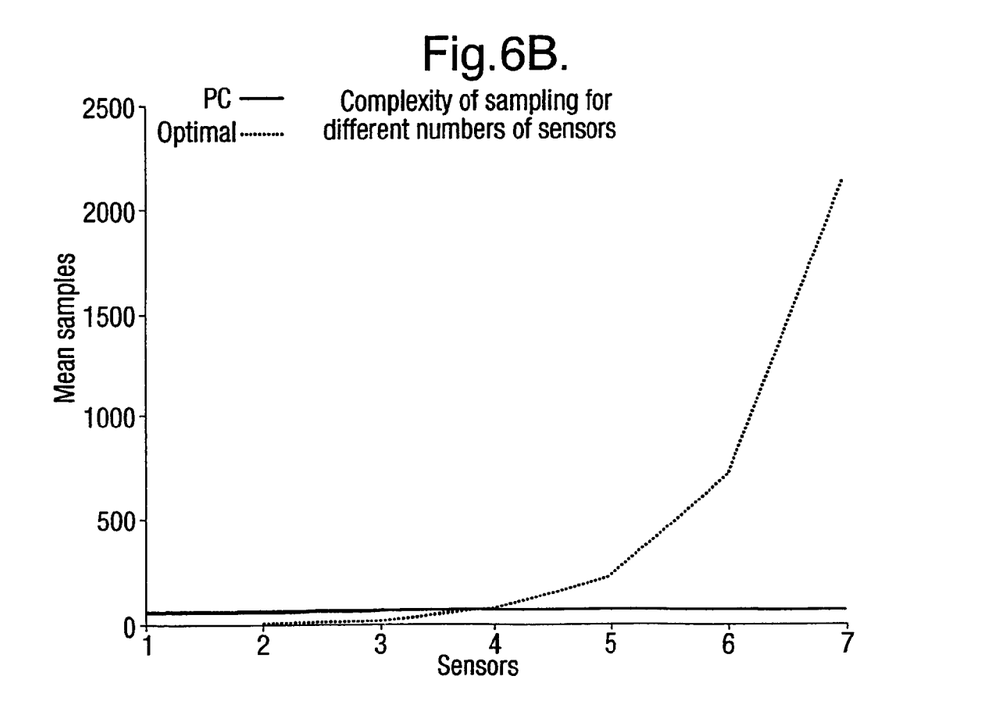

FIGS. 6A and 6B show the mean global information and samples during the scenario for the same tracking scenario with different numbers of sensors. FIG. 6A shows that the gap in performance between the joint optimal action and a selfish solution increases as the number of sensors is increased. The difference between the performance of PC and a brute force or optimal solution is difficult to see because the performance is the same. This verifies that the PC algorithm results in the optimal joint action to perform. FIG. 6B compares the number of samples required by PC to the complexity of the brute force or optimal approach. As FIG. 6B shows the complexity of the brute force approach increases exponentially, as the number of sensors is increased, while the complexity (samples required) of the PC algorithm remains constant. This provides a promising indication that the PC approach proposed will scale up to higher-dimensional problems.

Figure 3:
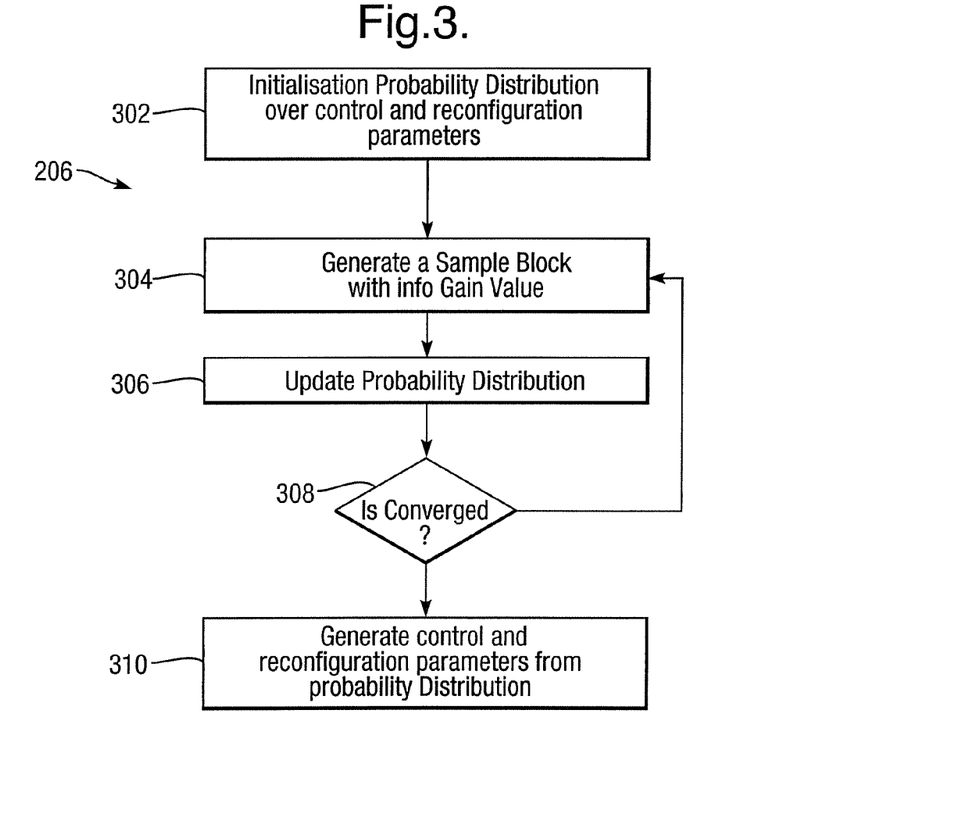
FIGS. 3 and 4 illustrate schematically further detail regarding the steps performed.

FIG. 3 illustrates steps performed during step 206 of FIG. 2. At step 302 initialisation takes place by specifying the probability of the target being measured by the sensor over the range of the sensor's allowed control or reconfiguration parameters (based on the sensor's predicted position as computed at step 204). In general this can be a flat distribution, or it could be biased toward a specific control parameter if there is good prior knowledge or operational reasons to support this.

At step 304 the sensor maintains a probability distribution, which may be over its own parameters, or over the parameters of at least some of the other sensors in the network (joint control parameters), depending on the characteristic of the control problem. In this step the sensor draws multiple independent samples from these distributions to generate a sample block. A cost/utility value is also associated with each sample, as will be explained below with reference to FIG. 4.

At step 306 the sensor updates the set of probability distributions over the control parameters. The probability distributions can be updated using a range of techniques, such as gradient descent or nearest Newton. The update can be performed using only the latest sample block (delayed sampling) or using all the sample blocks (Immediate Sampling). With Immediate Sampling, the probability distributions are updated using all the samples contained in the previous sample blocks using a weighted average. An unbiased estimated is achieved by using a weight based on the inverse variance of the sample block. Immediate sampling enables a well-principled approach to the reuse of previous samples and hence, reduces the number of samples that must be taken.

Another method to reduce the number of samples taken, and hence the communication between the sensors, is to adjust the parameter beta (e.g. beta=1/T in equation 4 above) automatically using parametric learning techniques. These are a general set of techniques that can be used by Immediate Sampling to refine its optimisation performance. One such parametric learning technique is cross-validation. Rather than use a fixed cooling schedule, the value of beta can be adapted to enable rapid cooling when possible. The optimal beta parameter is calculated using cross-validation. Cross-Validation is implemented by dividing the complete set of samples into two: a training set and a test set. The training set is used to update the probability distributions as above and then the test set is used to evaluate the cost associated with the new probability distributions. The beta parameter that results in minimising the cost function is used to update the probability distributions using the complete set of samples. Using cross-validation to adapt the beta parameter results in fewer samples and hence reduced communication between sensors.

The inventors have recognised the value of using these two techniques for solving sensor control problems in distributed networks. Specifically, they do not require a central control point and it is potentially less bandwidth-intensive than alternative distributed control solutions. The reasons for this are two-fold:

1. Immediate Sampling allows efficient reuse of old sample blocks such that the amount of communication between the sensors is significantly reduced.
2. Often, in stochastic optimisation methods, one has to 'guess' a cooling schedule and does so conservatively in order to capture a global solution. Cross-validation enables the cooling schedule to be set automatically so bandwidth (and compute) resources are not wasted on inappropriately fine-scaled searches.

The probability distributions can be updated using a variety of optimisation techniques, e.g. a simple hill-climbing algorithm. It will also be appreciated that other parametric learning techniques, such as Gaussian Processes, could be used to "intelligently" draw samples from the sensors' probability distributions over their actions. As these samples are communicated (typically over bandwidth constraint links) a reduced sample set is desirable.

At step 308 the set of probability distributions about the optimal control parameters are sharpened. This can be achieved using an iterative process that is terminated by a convergence criterion relating to a judgement about how sharp those distributions need to be in practice. In practice, this iterative process is likely to be controlled by two parameters: an upper limit on the time taken to perform the optimisation, and the accuracy of the sensor actuation. For example, if the sensor can only orientate to within +/−5 degrees then this will determine the variance (sharpness) of the target probability distribution required.

At step 310 the terminal probability distributions are sampled for a final time and the mean (or median) of those samples defined the sensing action which is then executed and the sensors to control/reconfigure it.

Figure 4:
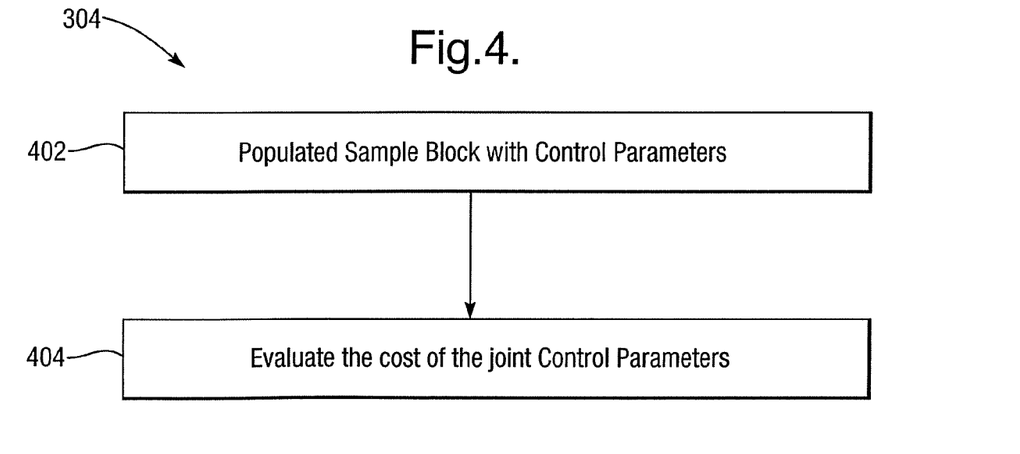
Figure 7A:
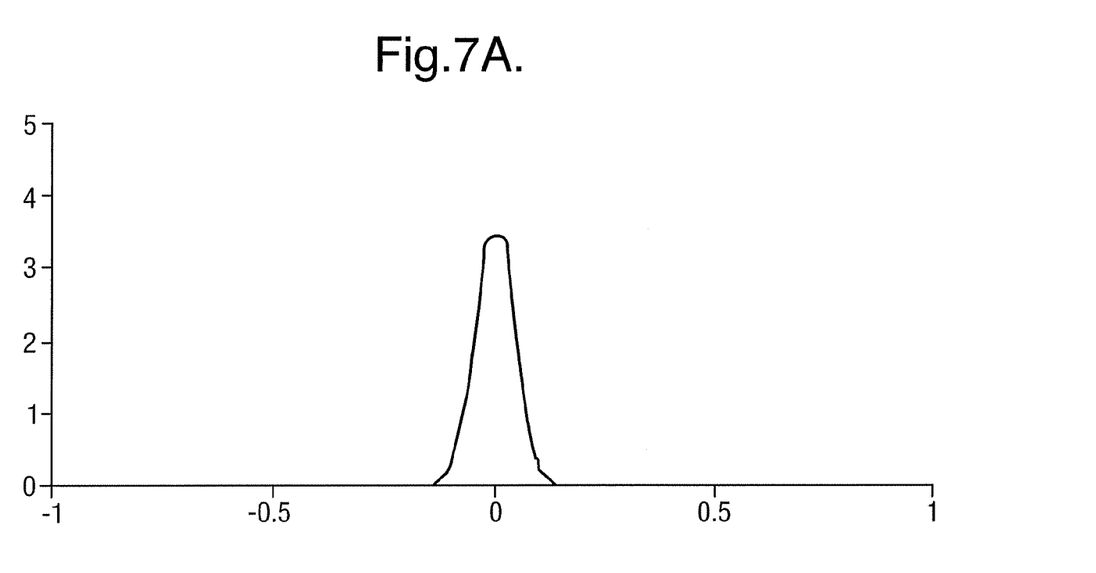
FIGS. 7A and 7B are graphical representations of example probability distributions.
Figure 7B:
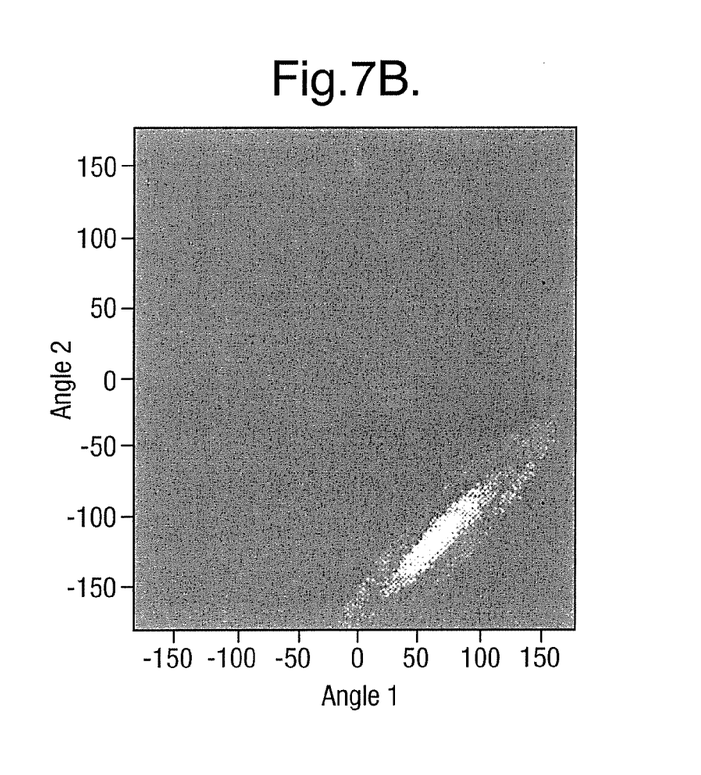

FIG. 4 illustrates steps performed during step 304 of FIG. 3. At step 402 an initial/empty sample block is populated with a joint set of control or reconfiguration parameters. A sample block can either be populated by a single sensor or by involving all sensors, depending on the type of control problem being solved. The control parameters are drawn from the current probability distributions. Graphical representations of example probability distributions are shown in FIGS. 7A and 7B. In FIG. 7A the X-axis represents a control parameter of the sensor, whilst the Y-axis represents the probability of the sensor measuring the target. In the example the line, the line peaks around value 0 on the X-axis represents, indicating that those control parameter values are the ones at which the sensor is most likely to measure the target. It will be appreciated that the probability distributions can be based on more than one control parameter of the sensor. In FIG. 7B the X-axis and the Y-axis represent two control parameters (e.g. tilt and pan angles), with the shading/colour of the plot representing the probability of the target being measured at those parameters.

At step 404, once the sample block has been populated with the control or reconfiguration parameters for all sensors, the cost of executing these parameters can be evaluated by all the sensors using Equation 5. The table below illustrates an example sample block.

| $\Theta_1$ | $\Theta_2$ | $\Theta_3$ | $H(\Theta_2)$ | $H(\Theta_2)$ | $H(\Theta_3)$ | G |
|---|---|---|---|---|---|---|
| 23 | 45 | 67 | 0.8 | 0.1 | 0.6 | 1 |
| 45 | 23 | 67 | 0.1 | 0.2 | 0.8 | 3 |

Where $\Theta_{1-3}$ are a set of three control parameters of the sensor (the angle to which the sensor will orientate in this case); H is the sampling probability with which the action ($\Theta_n$) was selected and G is the associate cost for the joint set of actions.

We claim:

1. A method of detecting one target from a plurality of targets, the method comprising:
    initializing a sensor of a sensor node among a plurality of sensor nodes in a decentralized sensor network; and
    in a processor of the sensor node:
    predicting states of a plurality of targets;
    generating a set of probability distributions, each said probability distribution in the set representing a setting or settings of at least one control parameter of the sensor;
    calculating an expected information gain value for each said control parameter in the set, a said information gain value representing an expected quality of a measurement of one of the targets taken by the sensor if controlled according to the control parameter, based on the predicted state of the target;
    updating the set of probability distributions to identify the sensor control parameters that maximise the expected information gain value, and
    controlling the sensor in accordance with the maximising control parameters.

2. A method according to claim 1, wherein the step of predicting the states of the targets is implemented using an information filter technique, that includes an Information-Based Kalman filter.

3. A method according to claim 2, wherein the target state corresponds to a spatial state of the target, such as coordinates representing its position; its bearing/trajectory and/or its velocity, and the step of predicting the target state uses a target motion model for the information filter technique.

4. A method according to claim 1, further including a step of using information regarding the state of the one target obtained by the sensor in the step of predicting the states of at least some of the targets.

5. A method according to claim 1, further including:
    receiving information regarding a state of a said target from the plurality of targets obtained by at least one other sensor, and
    using the target state information received from the at least one other sensor in the step of predicting the states of at least some of the targets.

6. A method according to claim 5, wherein the expected information gain value is calculated using an equation:

$$I_\theta(k) = \frac{1}{2} \log \frac{|Y(k|k-1) + I_\theta(k)|}{|Y(k|k-1)|}$$

where $Y(k|k-1)$ is an information matrix at time k based on all measurements made by the sensor and the at least one other sensor up to time k−1 and $I_\theta(k)$ is an information matrix associated with a measurement made by the first-mentioned sensor at time k for a set of said control parameters.

7. A method according to claim 6, further including transferring information regarding the state of the one target obtained by the sensor to the at least one other sensor.

8. A method according to claim 1, wherein the steps of generating the set of probability distributions and calculating the information gain values include:
    generating a sample block using the probability distributions over the control parameters of the sensor and the at least one other sensor;
    evaluating a global objective function;
    updating the set of probability distributions for the sensor and the at least one other sensor using the global objective function.

9. A method according to claim 8, wherein the updating of the set of probability distributions using the global objective function is achieved using a Monte Carlo Optimisation technique involving Immediate Sampling and parametric learning.

10. A method according to claim 9, wherein the parametric learning technique comprises cross-validation.

11. A computer program product comprising a non-transitory computer readable medium, having recorded thereon computer program code means, wherein the program code is loaded onto a computer, the computer executes a method of detecting one target from a plurality of targets, the method comprising:
    initializing a sensor of a sensor node among a plurality of sensor nodes in a decentralized sensor network, wherein the computer is associated with the sensor node; and
    in the computer of the sensor node:
    predicting states of a plurality of targets;
    generating a set of probability distributions, each said probability distribution in the set representing a setting or settings of at least one control parameter of the sensor;
    calculating an expected information gain value for each said control parameter in the set, a said information gain value representing an expected quality of a measurement of one of the targets taken by the sensor if controlled according to the control parameter, based on the predicted state of the target;
    updating the set of probability distributions to identify the sensor control parameters that maximise the expected information gain value, and
    controlling the sensor in accordance with the maximising control parameters.

12. A sensor node that detects one target from a plurality of targets, the sensor node comprising:
    a device for initializing a sensor of the sensor node, which is among a plurality of sensor nodes in a decentralized sensor network;
    a device for predicting states of a plurality of targets;
    a device for generating a set of probability distributions, each said probability distribution in the set representing a setting or settings of at least one control parameter of the sensor;
    a device for calculating an expected information gain value for each said control parameter in the set, a said information gain value representing an expected quality of a measurement of one of the targets taken by the sensor if controlled according to the control parameter, based on the predicted state of the target;
    a device for updating the set of probability distributions to identify the sensor control parameters that maximise the expected information gain value, and
    a device for controlling the sensor in accordance with the maximising control parameters.

* * * * *